United States Patent
Volodarsky

[11] Patent Number: 6,126,188
[45] Date of Patent: Oct. 3, 2000

[54] UNIHITCH ASSEMBLY

[76] Inventor: Alexander Volodarsky, 10 Radio Ter., San Francisco, Calif. 94116

[21] Appl. No.: 09/412,094

[22] Filed: Oct. 4, 1999

[51] Int. Cl.⁷ ........................................................ B60D 1/36
[52] U.S. Cl. ................................... 280/478.1; 280/491.2; 280/491.5; 280/511; 224/544; 224/917
[58] Field of Search ............................... 280/416.1, 507, 280/511, 491.2, 478.1, 482, 491.5, 498, 499, 495; 224/544, 571, 924, 917, 281, 488, 511

[56] References Cited

U.S. PATENT DOCUMENTS

| | | |
|---|---|---|
| 4,078,823 | 3/1978 | McBride . |
| 4,381,069 | 4/1983 | Kreck ..................................... 224/42.44 |
| 5,232,133 | 8/1993 | Speer . |
| 5,322,313 | 6/1994 | Schroeder ............................. 280/416.1 |
| 5,351,982 | 10/1994 | Walrath ................................. 280/495 |
| 5,354,087 | 10/1994 | Head . |
| 5,560,630 | 10/1996 | Phares et al. ......................... 280/416.1 |
| 5,819,542 | 9/1998 | Ostrander . |
| 5,857,693 | 1/1999 | Clark ..................................... 280/511 |

*Primary Examiner*—Anne Marie Boehler
*Attorney, Agent, or Firm*—Michael I. Kroll

[57] ABSTRACT

The present invention 10 discloses a trailer hitch extension member 20 mountable on a conventional rear box end receiver trailer hitch mounting arm 14. The extendable rotatable hitch/trailer coupling device 10 which communicates between a conventional vehicle's hitch mounting arm 14 and a trailer tongue 16 having a trailer hitch connecting or securing means on its front tongue 62 permits a single individual to hook up a trailer 16. The present invention 10 extends the conventional hitch mounting arm 14 from a fixed point, to an elliptical connection zone whereby the hitch extension member 20 and swivel head member 18 can be selectively engaged either individually or in concert to extend to the trailer hitch component 16.

9 Claims, 11 Drawing Sheets

UNIHITCH ASSEMBLY

BACKGROUND OF THE INVENTION

1. Field of the Invention

The present invention relates generally to trailer hitches and, more specifically, to an extendable rotatable hitch/trailer-coupling device which communicates between an existing vehicle's hitch mounting arm and a trailer's securing means. Said device extends the means for engaging a trailer by an existing hitch mounting arm from an exact point, which usually requires an additional person giving directions as the vehicle approaches the trailer, to an elliptical connection zone whereby the hitch extension member and swivel head member can be selectively engaged either individually or in concert to extend to the trailer hitch component.

The present invention is a hitch assembly comprising a rotative coupling sub-assembly and a hitch extension sub-assembly having additional elements comprising a rack sub-assembly for carrying bicycles and/or skis.

The hitch sub-assembly is comprised of a hitch extension member and a hitch extension member plug.

The hitch assembly is mounted to the existing main hitch-mounting arm by inserting the hitch extension member into the aperture of the main hitch mounting arm and fixedly being attached thereto by means of the hitch pin.

The hitch extension member has a plurality of spaced apart oppositely opposed transverse holes providing means for selectively choosing, aligning and fixedly positioning said choice with the main hitch mounting arm hole using the hitch attachment pin thereby longitudinally extending the hitch coupling mechanism. In addition the hitch extension member has a rotative coupling sub-assembly positioned on the other end of said hitch extension member.

The rotative coupling sub-assembly is comprised of a swivel head, pivot bolt, swivel head spacer, swivel head spacer washers, and an L-shaped swivel head cap member. Said rotative coupling sub-assembly is mounted onto and supported by the hitch extension member. The swivel head is positioned between the cavity of the L-shaped rotative coupling cap member and the extension member. Said L-shaped rotative coupling cap member and extension member being spaced apart by the swivel head spacer positioned within the swivel head aperture and rotatively fixed therein by inserting the pivot bolt.

2. Description of the Prior Art

There are other hitch attachment device designed for aiding in coupling a trailer. Typical of these is U.S. Pat. No. 4,078,823 issued to McBride on Mar. 14, 1978.

Another patent was issued to Speer on Aug. 3, 1993 as U.S. Pat. No. 5,232,133. Yet another U.S. Pat. No. 5,354,087 was issued to Head on Oct. 11, 1994 and still yet another was issued on Sep. 22, 1998 to Ostrander as U.S. Pat. No. 5810,542.

U.S. Pat. No. 4,078,823

Inventor: Charles H. McBride

Issued: Mar. 14, 1978

A vertically adjustable hitch for securing the drawbar of a towing vehicle to the tongue of a trailer in relative positions of vertical alignment comprises first and second mounting means mounting the interlocking members one comprises a retainer receiving a plurality of pads adjustably mounted in interchangeable vertical relation. One of the pads extends outwardly from the others and mounts one of the interlocking members. A fasteners releasably fastens the pads in the retainer in the selected relative positions of vertical alignment, thereby aligning vertically the two interlocking members. cl U.S. Pat. No. 5,232,133

Inventor: William W. Speer

Issued: Aug. 3, 1993

An article carrier connectable to a vehicle trailer hitch ball is disclosed. The article carrier comprises a vertical support member having a horizontal support member connected to its upper end and a hitch ball receptacle attached to its lower end. Hanger arm support sleeves are attached to the horizontal support member and bike hanger arms are rotatably coupled to the hanger arm support sleeves. The bike hanger arms can be rotated to be carried in either the transport position to carry bicycles and the like or storage position. Upper and lower ski attachments can be attached to the hanger arm support sleeves and the lower end of the vertical support member, respectively, for carrying ski equipment. In addition, a table top can be attached to the vertical support member to form a table when the article carrier is detached from the vehicle.

U.S. Pat. No. 5,354,087

Inventor: Harold W. Head

Issued: Oct. 11, 1994

An adjustable trailer hitch for hitching a trailer to a vehicle. The trailer hitch includes a first plate attached to the trailer and a second plate attached to a ball coupler. The first plate includes a slot, and the second plate includes two holes through which bolts may be inserted whereby unlimited adjustment between the plates can be achieved within a predefined range. The trailer hitch also includes a tongue having a coupler plate attached to one side. A pivot plate is pinned to the coupler plate and a latch pin is inserted through the tongue, coupler plate and pivot plate for latching the pivot plate. The latch pin and pivot plate are free to move when the trailer is being hitched to the vehicle.

U.S. Pat. No. 5,810,542

Inventor: Jerry Ostrander

Issued: Sep. 22, 1998

A load securing device for a vehicle includes a hitch mechanism securable to a vehicle for selectively fixing a trailer to the vehicle for being towed thereby. A load carrying mechanism for carrying loads externally of the vehicle, and a fastening mechanism for fastening the load carrying mechanism to the hitch mechanism such that both the load carrying mechanism and the hitch mechanism may be simultaneously used. The hitch mechanism is adjustable such that a trailer engaging hitch member thereof may be stably disposed at different vertical levels relative to the vehicle, and the hitch mechanism is also adjustable such that the hitching member may be disposed at different longitudinally projecting positions relative to the vehicle. The load carrying mechanism is adjustable in longitudinal, lateral and vertical dimensions for securing different size and shape loads, and the fastening mechanism is also adjustable for fastening the load carrying mechanism to the hitch mechanism in both an operative, erect position thereof and a collapsed, storage position thereof. A device also includes a theft deterrence mechanism for selectively locking the load carrying mechanism to the hitch mechanism in both the operative and storage positions thereof.

While these hitch attachment devices may be suitable for the purposes for which they were designed, they would not be as suitable for the purposes of the present invention, as hereinafter described.

SUMMARY OF THE PRESENT INVENTION

The present invention discloses a trailer hitch extension mountable on a conventional rear box end receiver trailer hitch mounting arm. The extendable rotatable hitch/trailer coupling device which communicates between a conventional vehicle's hitch mounting arm and a trailer tongue having a trailer hitch connecting or securing means on its front tongue permits a single individual to hook up a trailer. The present invention extends the conventional hitch mounting arm from a fixed point, to an elliptical connection zone whereby the hitch extension member and swivel head member can be selectively engaged either individually or in concert to extend to the trailer hitch component.

A primary object of the present invention is to provide a hitch device which can be used by a single person to attach a trailer.

Another object of the present invention is to provide a hitch device which can be attached to an existing vehicle trailer hitch.

Yet another object of the present invention is to provide a hitch device which can be attached to an existing vehicle's hitch mounting arm can be selectively extended or retracted as needed.

Still yet object of the present invention is to provide a hitch device which can be attached to an existing vehicle's hitch mounting arm and can be selectively rotated as needed.

Yet another object of the present invention is to provide a hitch device which can be attached to an existing vehicle's hitch mounting arm and can be selectively extended or retracted and rotated as needed.

Another object of the present invention is to provide a hitch device which can be attached to an existing vehicle's hitch mounting arm and can be selectively extended or retracted and rotated as needed having additional elements which can be used to carry such object as skis and/or bikes.

Additional objects of the present invention will appear as the description proceeds.

The present invention overcomes the shortcomings of the prior art by providing an extendable rotatable hitch/trailer coupling device which communicates between an existing vehicle's hitch mounting arm and a trailer's securing means by extending the means for engaging a trailer and an existing hitch mounting arm from an exact point to an elliptical connection zone whereby the hitch extension member and swivel head member can be selectively engaged either individually or in concert to attach to the trailer hitch component.

The present invention provides a hitch assembly comprising a rotative coupling sub-assembly and a hitch extension sub-assembly having additional elements comprising a rack sub-assembly for carrying bicycles and/or skis.

The hitch assembly is mounted to an existing hitch mounting arm by inserting the hitch extension member into the aperture of the hitch mounting arm and fixedly being attached thereto by means of the hitch pin.

The hitch extension member having a plurality of spaced apart oppositely opposed transverse holes provides means for selectively choosing, aligning and fixedly positioning said choice with the main hitch mounting arm hole using the hitch attachment pin thereby longitudinally extending the hitch coupling mechanism.

The rotative coupling sub-assembly provides means for rotating the hitch coupling member to engage the trailer coupling member.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 vehicle
14 conventional trailer hitch
16 trailer
18 rotative coupling
20 hitch extension
22 plug
24 transverse holes
26 hitch attachment pin
28 swivel head
30 cap member
32 conventional hitch mounting arm
34 conventional hitch mounting arm aperture
36 conventional hitch hole
38 main pivot bolt
39 aperture
40 spacer
42 washer
44 aperture of swivel head
46 aperture of hitch extension
48 cavity area
50 spacer aperture
52 alternate swivel head
54 means for mounting skis
56 means for mounting bike
58 bolts
60 pin
62 hitch ball
63 hitch ball aperture
64 direction arrow
66 mounting means/aperture
68 swivel trailer rest
70 box aperture
72 pin connecting member
74 pin connecting member aperture

DESCRIPTION OF THE PREFERRED EMBODIMENT(S)

In order that the invention may be more fully understood, it will now be described, by way of example, with reference to the accompanying drawings in which FIGS. 1 through 11 illustrate the present invention being a trailer hitch and carrier assembly.

Figure 1:
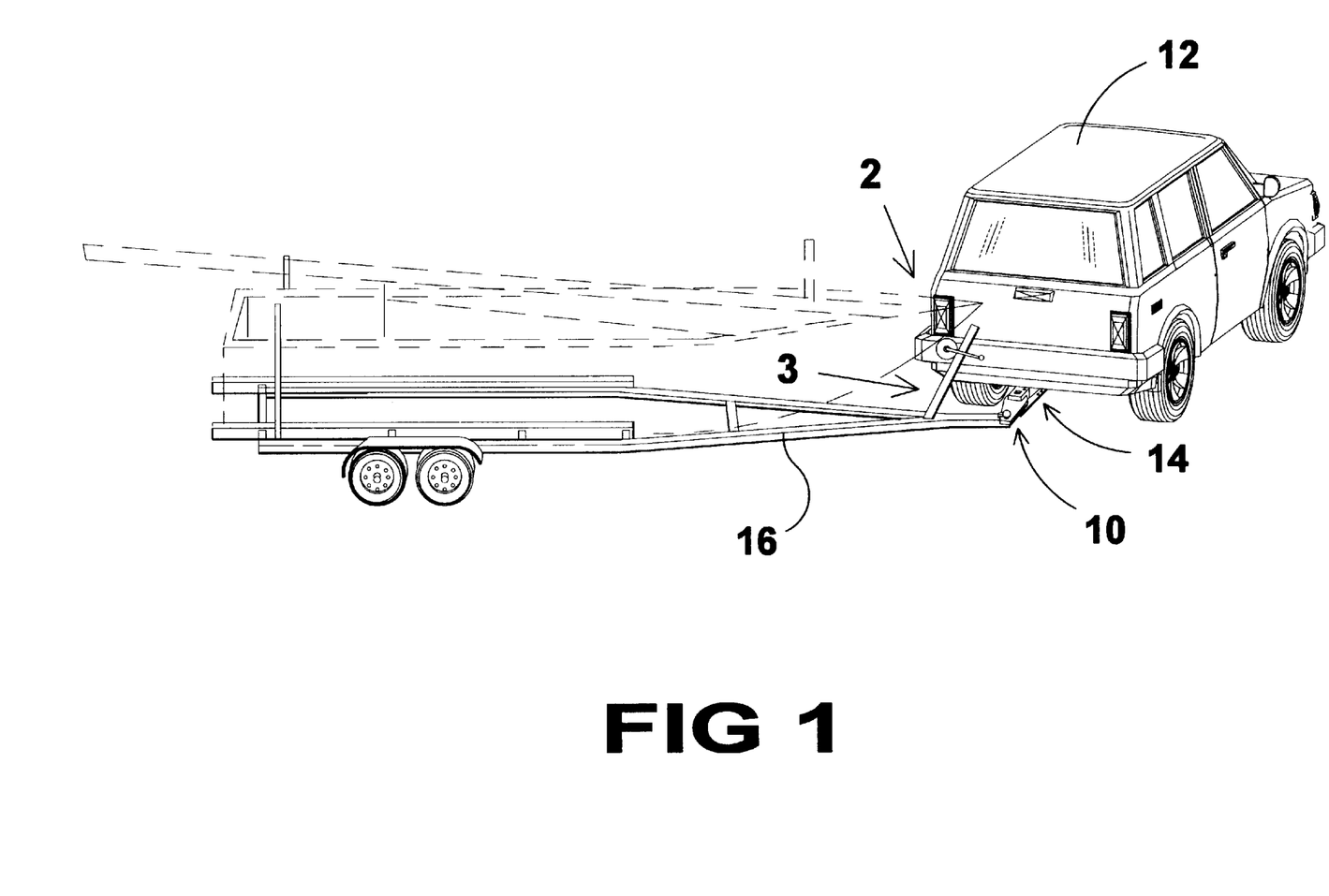
FIG. 1 is a perspective view of the present invention in use. Shown is a vehicle having the present invention installed on an existing hitch mounting arm.

Turning to FIG. 1, shown therein is a perspective view of the present invention 10 in use. Shown is a vehicle 12 having the present invention 10 installed on a conventional rear box end receiver type trailer hitch mounting arm 14. The extendable rotatable hitch/trailer coupling device 10 which communicates between a conventional vehicle's hitch mounting arm 14 and a trailer tongue 16 having a trailer hitch connecting or securing means on its front tongue permits a single individual to hook up a trailer 16. The present invention 10 extends the conventional hitch mounting arm 14 from a fixed point, to an elliptical connection zone whereby the hitch extension member and swivel head member can be selectively engaged either individually or in concert to extend to the trailer hitch component 16.

The hitch assembly of the present invention 10 is mounted to the existing main hitch mounting arm by inserting the hitch extension member into the box end aperture of the main hitch mounting member 14 and fixedly being attached thereto by means of the hitch pin.

Figure 2:
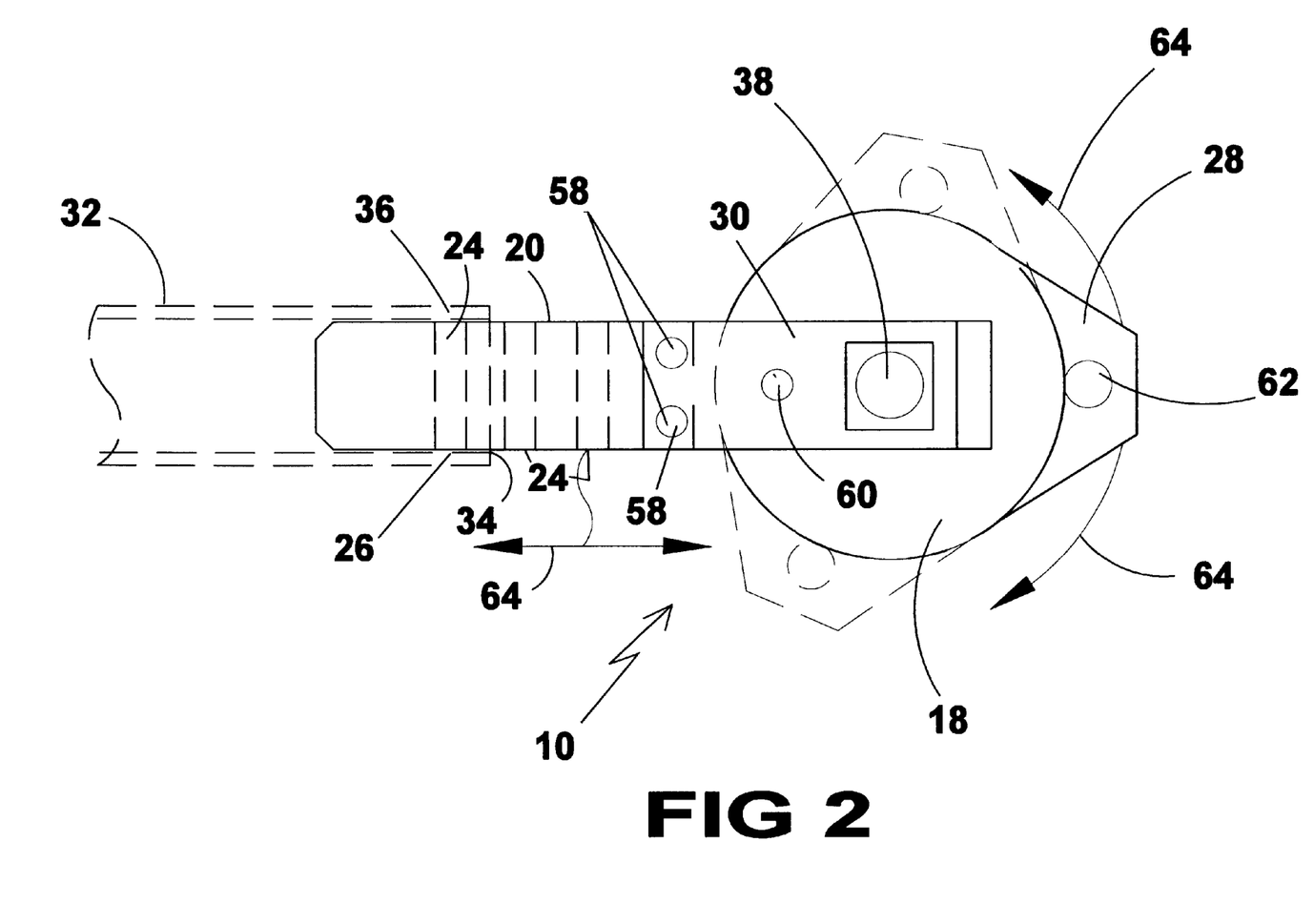
FIG. 2 is a top view of the present invention taken from FIG. 1 as indicated. Shown is the hitch assembly inserted into the hitch mounting arm. The hitch assembly comprising a rotative coupling sub-assembly and a hitch extension sub-assembly having additional elements comprising a rack sub-assembly, not shown, for carrying bicycles and/or skis.

Turning to FIG. 2, shown therein is a top view of the present invention 10 taken from FIG. 1 as indicated. Shown is the hitch assembly 10 inserted into the conventional box end hitch mounting arm 32. The hitch assembly 10 comprising a rotative coupling sub-assembly 18 and a hitch extension sub-assembly 20 having additional elements comprising a rack sub-assembly (not shown) for carrying bicycles and/or skis. The hitch sub-assembly is comprised of a hitch extension member 20 and a hitch extension member plug (not shown).

The hitch assembly is mounted to the conventional main hitch mounting arm 32 by inserting the hitch extension member 20 into the aperture 34 of the main hitch mounting arm 32 and fixedly being attached thereto by means of the hitch pin 26.

The hitch extension member 20 has a plurality of spaced apart oppositely opposed transverse holes 24 providing means for selectively choosing, aligning and fixedly positioning the chosen hole within the main hitch mounting arm hole 36 using the hitch attachment pin 26 thereby longitudinally extending the entire hitch coupling mechanism of the present invention 10. In addition the hitch extension member 20 has a rotative coupling sub-assembly 18 positioned on the other end of the hitch extension member 20.

The rotative coupling sub-assembly is comprised of a swivel head 28, main pivot bolt 38, e.g., 1¼ inch bolts, swivel head spacer (not shown), swivel head spacer washers (not shown), and an L-shaped swivel head cap member 30. The rotative coupling sub-assembly 18 is mounted onto and supported by the hitch extension member 20. The swivel head 28 is positioned between the cavity (not shown) of the L-shaped rotative coupling cap member 30 and the extension member 20. Multiple bolts 58, e.g., ½ inch bolts, attach the cap member 30 to extension member 20. A removable pin 60, e.g., a ⅝ inch pin, passes through cap member 30 into and through the swivel head 28 to lock the swivel head into position for towing the trailer 16. Trailer hitch ball 62 and direction arrows 64 showing rotation through at least a 180 degree arch are also shown.

Figure 3:
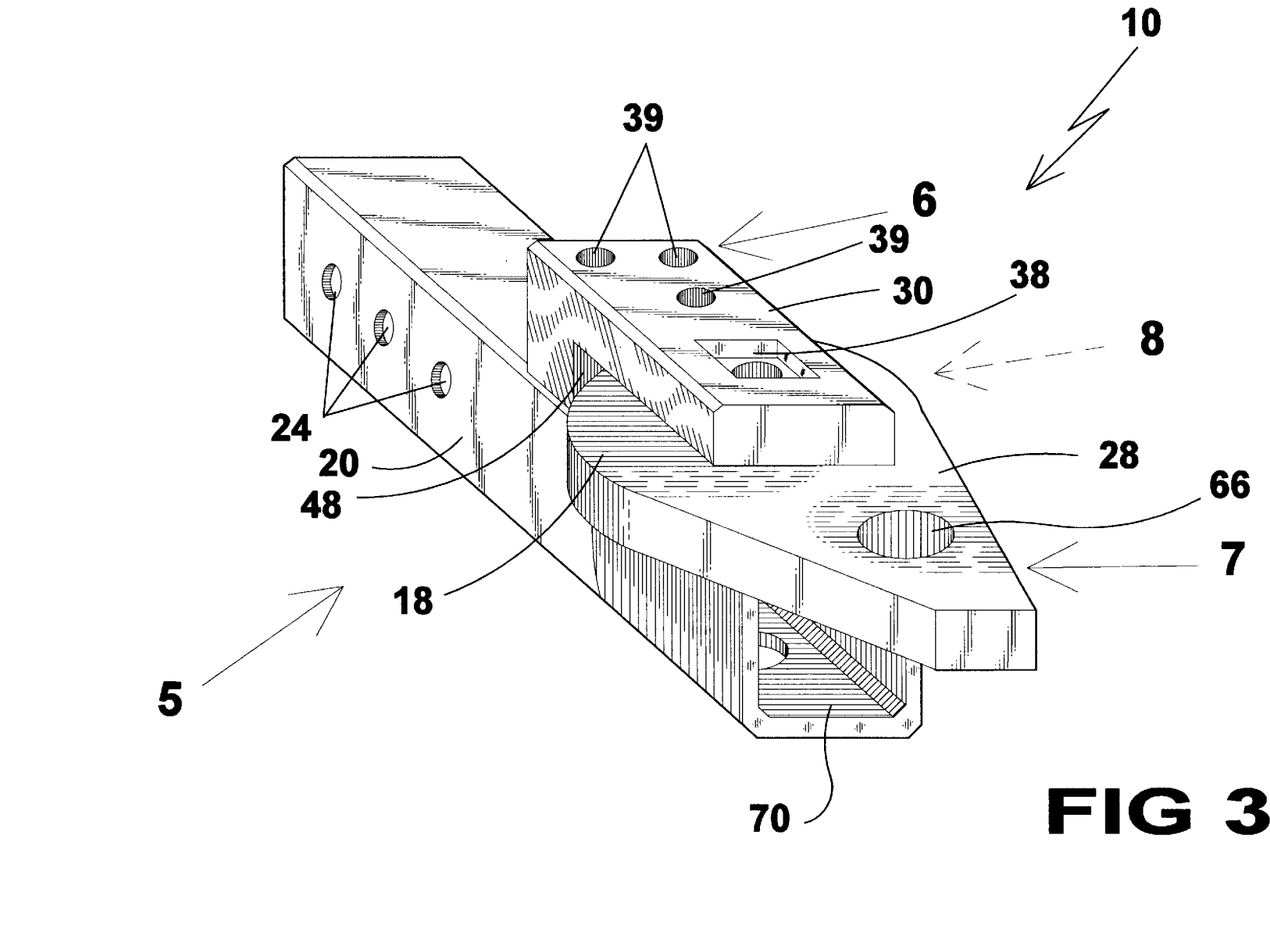
FIG. 3 is a perspective view of the present invention taken from FIG. 1 as indicated. Shown is the hitch assembly comprising a rotative coupling sub-assembly and a hitch extension sub-assembly having additional elements comprising a rack sub-assembly, not shown, for carrying bicycles and/or skis.

Turning to FIG. 3, shown therein is a perspective view of the present invention 10 taken from FIG. 1 as indicated. Shown is the hitch assembly 10 comprising a rotative coupling sub-assembly 18 and a hitch extension sub-assembly 20 having additional elements comprising a mounting means 66, e.g., an aperture, (not shown) for carrying bicycles and/or skis 54,56 (not shown).

The hitch assembly is mounted to the conventional main hitch mounting arm by inserting the hitch extension member 20 into the aperture of the main hitch mounting arm and fixedly being attached thereto by means of the hitch pin (not shown).

The hitch extension member 20 has a plurality of spaced apart oppositely opposed transverse holes 24 providing means for selectively choosing, aligning and fixedly positioning the chosen hole with the main hitch mounting arm hole using the hitch attachment pin 26 (not shown) thereby longitudinally extending the hitch coupling mechanism. In addition the hitch extension member 20 has a rotative coupling sub-assembly 18 positioned on the other end of said hitch extension member 20.

The rotative coupling sub-assembly 18 is comprised of a swivel head 28, pivot bolt aperture 39, and an L-shaped swivel head cap member 30. The rotative coupling sub-assembly 18 is mounted onto and supported by the hitch extension member 20. The swivel head 28 is positioned between the partial cavity 48 formed by the L-shaped rotative coupling cap member 30 and the extension member 20. The L-shaped rotative coupling cap member 30 and extension member 20 being spaced apart by the swivel head spacer (not shown) positioned within the swivel head aperture and rotatively fixed therein by inserting the pivot bolt. Apertures 39 for bolts 58 and pin 60 are also shown along with box aperture 70.

Figure 4:
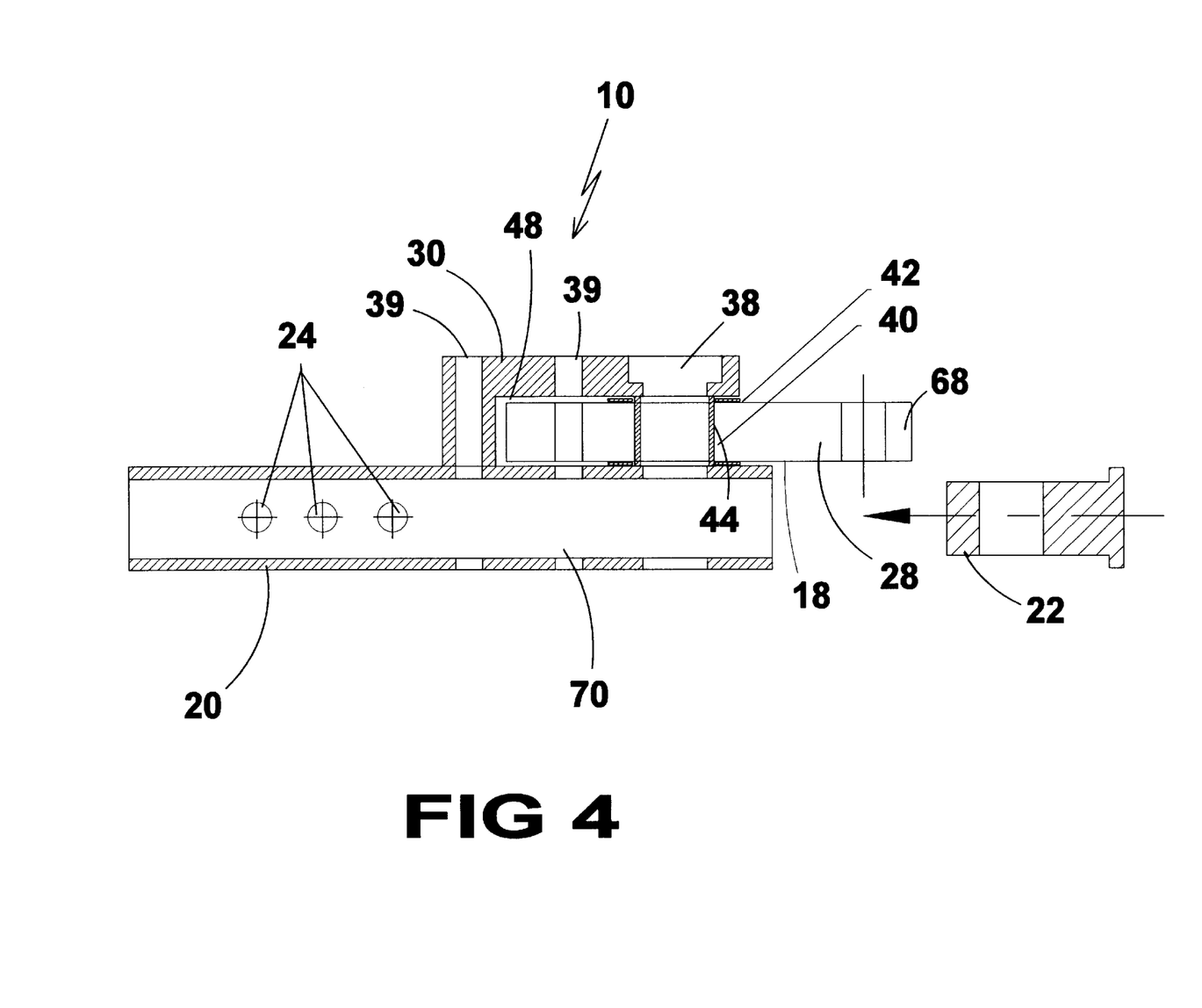
FIG. 4 is a cross section of the hitch assembly taken from FIG. 3 as indicated. Shown is the hitch assembly comprising a rotative coupling sub-assembly and a hitch extension sub-assembly having additional elements comprising a rack sub-assembly, not shown, for carrying bicycles and/or skis.

Turning to FIG. 4, shown therein is a cross section of the hitch assembly 10 taken from FIG. 3 as indicated. Shown is the hitch assembly comprising a rotative coupling sub-assembly 18 and a hitch extension sub-assembly 20 having additional elements comprising a rack sub-assembly (not shown) for carrying bicycles and/or skis. A swivel trailer rest 68 is also shown.

The hitch sub-assembly is comprised of a hitch extension member 20 and a hitch extension member plug 22 for insertion into a box aperture 70 on the front of extension member 20.

The hitch extension member 20 has a plurality of spaced apart oppositely opposed transverse holes 24 providing means for selectively choosing, aligning and fixedly positioning the chosen hole with the main hitch mounting arm hole (not shown) using the hitch attachment pin thereby longitudinally extending the hitch coupling mechanism. In addition the hitch extension member 20 has a rotative coupling sub-assembly 18 positioned on the opposite end of the hitch extension member 20.

The rotative coupling sub-assembly 18 is comprised of a swivel head 28, pivot bolt 38, swivel head spacer 40, swivel head spacer washers 42, and an L-shaped swivel head cap member 30. The rotative coupling sub-assembly 18 is mounted onto and supported by the hitch extension member 20. The swivel head 28 is positioned within a partial cavity 48 formed by the L-shaped rotative coupling cap member 30 and the extension member 20. The L-shaped rotative coupling cap member 30 and extension member 20 being spaced apart by the swivel head spacer 40 positioned within the swivel head aperture 44 and rotatively fixed therein by inserting the pivot bolt 38. Apertures 39 are also shown for bolts 58 and pins 60.

Figure 5:
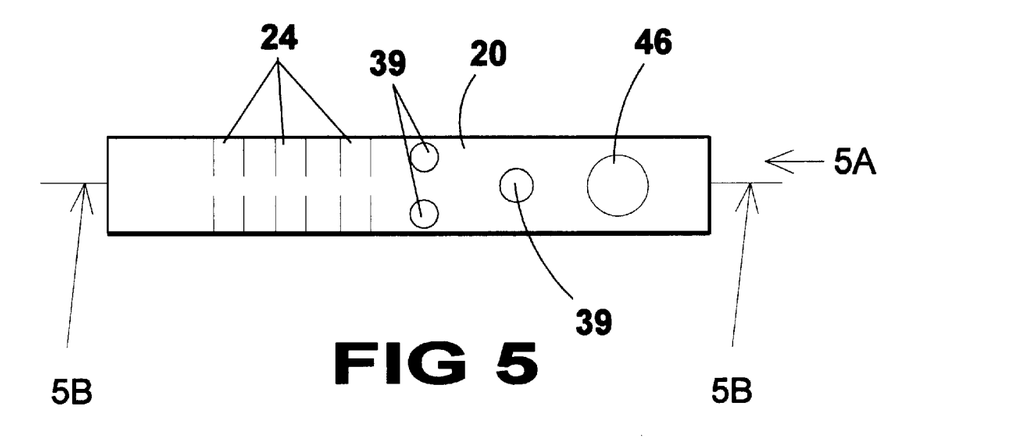
FIG. 5 is a plan view of the hitch extension member, taken from FIG. 3 as indicated. Shown is the hitch extension member having means for mounting said member to an existing hitch mounting arm by inserting the hitch extension member into the aperture of the main hitch mounting arm and fixedly attaching said member by means of the hitch pin.

Turning to FIG. 5, shown therein is a plan view of the hitch extension member 20, taken from FIG. 3 as indicated. Shown is the hitch extension member 20 having means for mounting the member to an existing hitch mounting arm by inserting the hitch extension member 20 into the aperture of the main hitch mounting arm and fixedly attaching the member 20 by means of the hitch pin. The hitch extension member 20 has a plurality of spaced apart oppositely opposed transverse holes 24 providing means for selectively choosing, aligning and fixedly positioning the chosen hole with the main hitch mounting arm hole using the hitch attachment pin therein longitudinally extending the hitch coupling mechanism. In addition the hitch extension member has means being aperture 46 for fixedly attaching a rotative coupling sub-assembly on the other end of said hitch extension member 20. Apertures 39 are also shown.

Figure 5A:
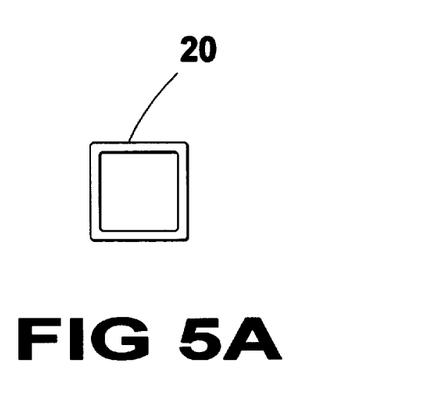
FIG. 5A is an end view of the hitch extension member taken from FIG. 5 as indicated.

Turning to FIG. 5A, shown therein is an end view of the box-like hitch extension member 20 taken from FIG. 5 as indicated.

Figure 5B:
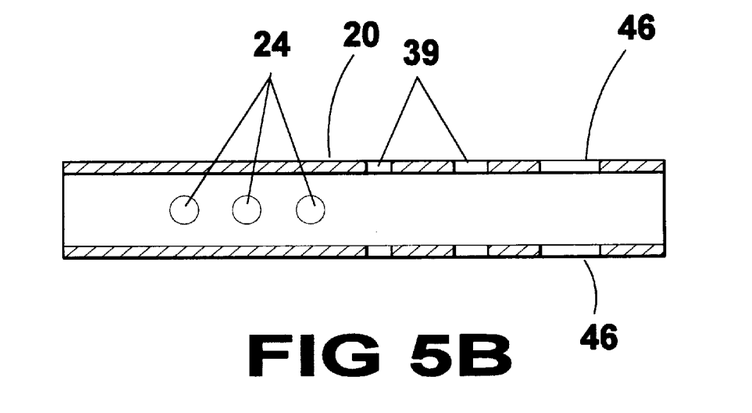
FIG. 5B is a cross sectional view of the hitch extension member, taken from FIG. 3 as indicated. Shown is the hitch extension member having means for mounting said member to an existing hitch mounting arm by inserting the hitch extension member into the aperture of the main hitch mounting arm and fixedly attaching said member by means of the hitch pin.

Turning to FIG. 5B, shown therein is a cross sectional view of the hitch extension member 20, taken from FIG. 3 as indicated. The hitch extension member 20 has a plurality of spaced apart oppositely opposed transverse holes 24 providing means for selectively choosing, aligning and fixedly positioning the chosen hole with the main hitch mounting arm hole using the hitch attachment pin therein longitudinally extending the hitch coupling mechanism. In addition the hitch extension member has means being an aperture 46 for fixedly attaching a rotative coupling sub-assembly on the other end of said hitch extension member. Apertures 39 are also shown.

Figure 6:
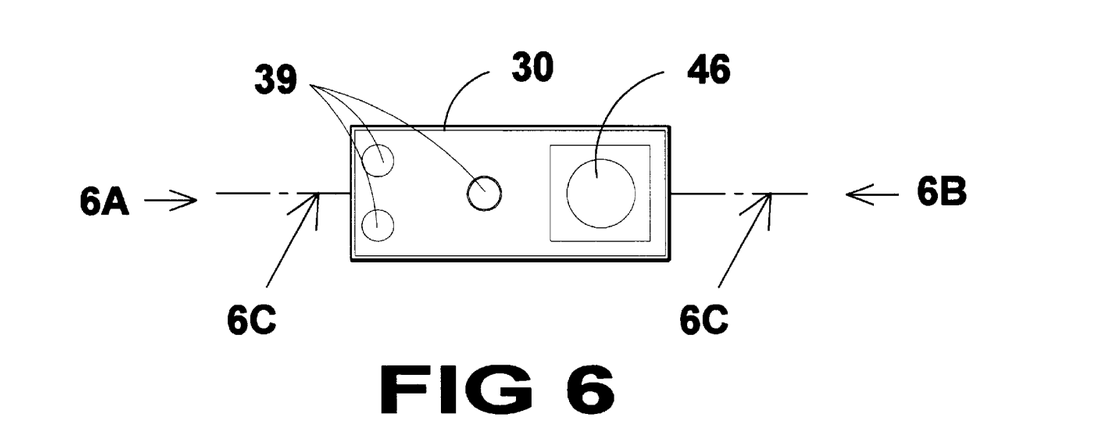
FIG. 6 is a top view of the L-shaped swivel head cap member, taken from FIG. 3 as indicated. Said L-shaped swivel head cap member is part of the rotative coupling sub-assembly.

Turning to FIG. 6, shown therein is a top view of the L-shaped swivel head cap member 30, taken from FIG. 3 as indicated. The L-shaped swivel head cap member 30 is part of the rotative coupling sub-assembly. Apertures 46 and 39 are also shown.

Figure 6A:
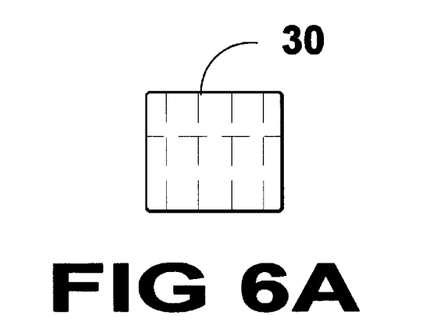
FIG. 6A is an end view of the L-shaped swivel head cap member, taken from FIG. 6 as indicated.

Turning to FIG. 6A, shown therein is an end view of the L-shaped swivel head cap member 30, taken from FIG. 6 as indicated.

Figure 6B:
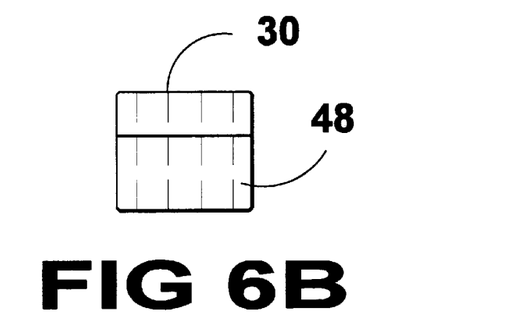
FIG. 6B is the other end view of the L-shaped swivel head cap member, taken from FIG. 6 as indicated. Shown is the cavity formed wherein is placed the swivel head having the swivel head spacer and necessary washers.

Turning to FIG. 6B, shown therein is the other end view of the L-shaped swivel head cap member 30, taken from FIG. 6 as indicated. Shown is the partial cavity area 48 formed wherein is placed the swivel head.

Figure 6C:
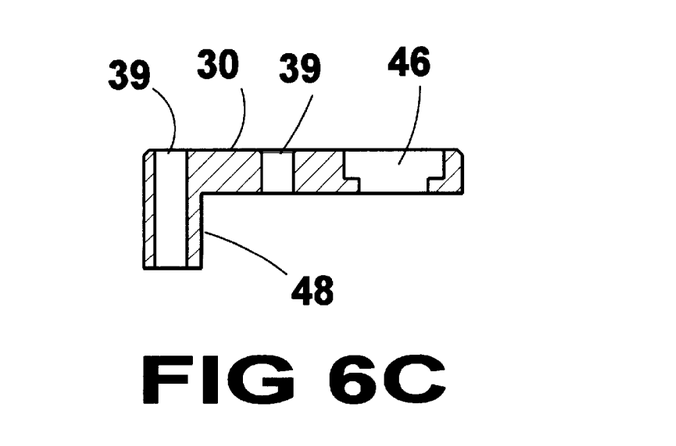
FIG. 6C is a cross section taken from FIG. 6 as indicated. The L-shaped swivel head cap member is part of the rotative coupling sub-assembly. Said rotative coupling sub-assembly is mounted onto and supported by the hitch extension member.

Turning to FIG. 6C, shown therein is a cross section taken from FIG. 6 as indicated. The L-shaped swivel head cap member 30 is part of the rotative coupling sub-assembly. The swivel head is positioned within the partial cavity 48 of the L-shaped rotative coupling cap member 30 and the extension member. Apertures 46 and 39 are also shown.

Figure 7:
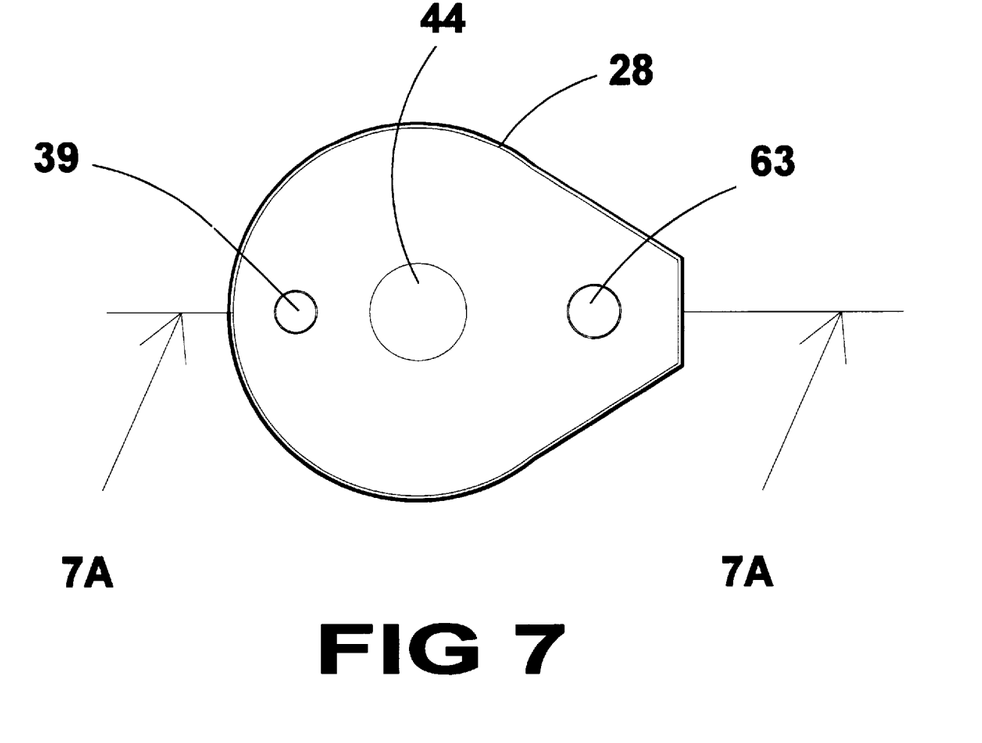
FIG. 7 is a top view of swivel head, taken from FIG. 3 as indicated. Said swivel head is the rotative element of the rotative coupling sub-assembly.

Turning to FIG. 7, shown therein is a top view of swivel head 28, taken from FIG. 3 as indicated. The swivel head is the rotative element of the rotative coupling sub-assembly. Aperture 44 for the main bolt, aperture 39 for pin 60 and a hitch ball aperture 63 are shown.

Figure 7A:
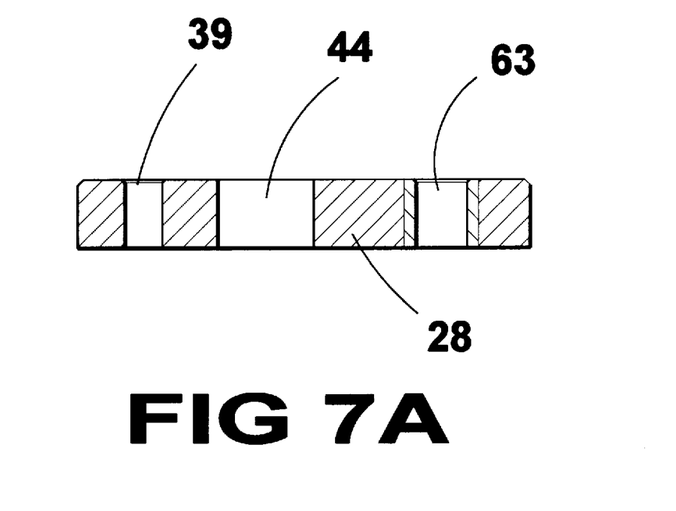
FIG. 7A is a cross sectional view of swivel head, taken from FIG. 7 as indicated. Shown are aperture means for mounting the pivot pin and aperture means for preventing said swivel head from rotating.

Turning to FIG. 7A, shown therein is a cross sectional view of swivel head 28, taken from FIG. 7 as indicated. Shown are aperture means 44 for mounting the main pivot bolt and aperture means 39 for preventing the swivel head 28 from rotating by using pin 60. Trailer ball aperture 63 is also shown.

Figure 8:
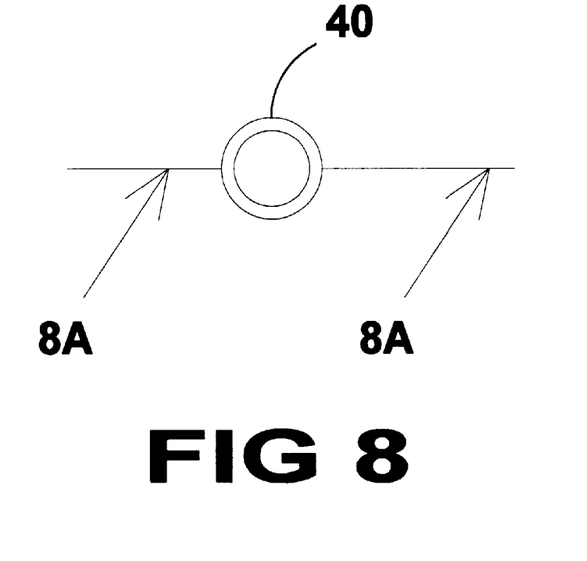
FIG. 8 is a top view of swivel head spacer, taken from FIG. 3 as indicated. Said swivel head spacer is part of the rotative coupling sub-assembly and acts as a bushing between said pivot pin and said swivel head.

Turning to FIG. 8, shown therein is a top view of swivel head spacer 40, taken from FIG. 3 as indicated. The swivel head spacer 40 is part of the rotative coupling sub-assembly 18 and acts as a bushing between the pivot bolt and the swivel head.

Figure 8A:
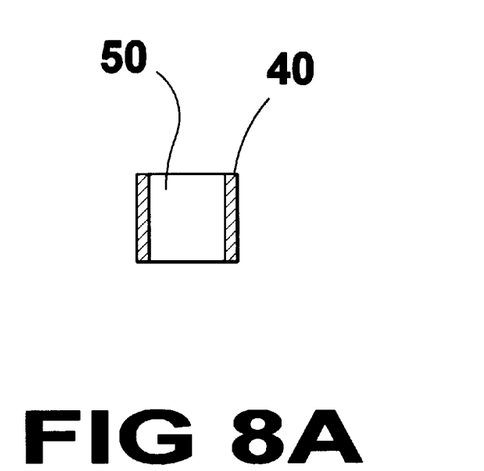
FIG. 8A is a cross sectional view of swivel head spacer, taken from FIG. 8 as indicated, shown are aperture means for mounting the pivot pin.

Turning to FIG. 8A, shown therein is a cross sectional view of swivel head spacer 40, taken from FIG. 8 as indicated. Shown is an aperture 50 for mounting the pivot bolt 38.

Figure 9:
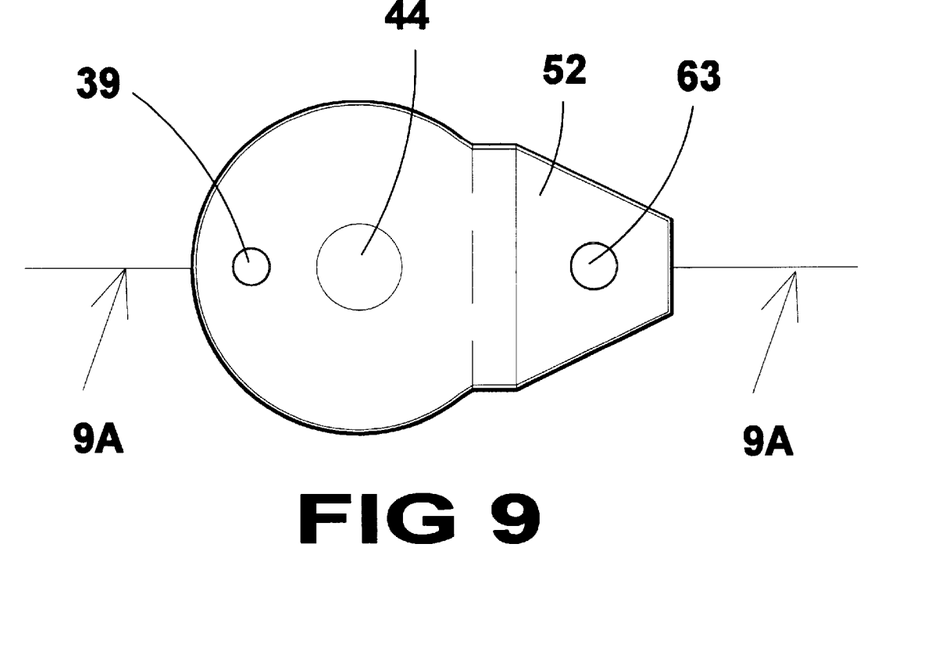
FIG. 9 is a top view of an alternate element for the swivel head as shown in FIG. 7. Said swivel head is the rotative element of the rotative coupling sub-assembly and has offset means for attaching the trailer.

Turning to FIG. 9, shown therein is a top view of an alternate element for the swivel head 52 as shown in FIG. 7. The swivel head is the rotative element of the rotative coupling sub-assembly 18 and has offset means for attaching the trailer 16. Apertures 39, 44 and 63 are shown.

Figure 9A:
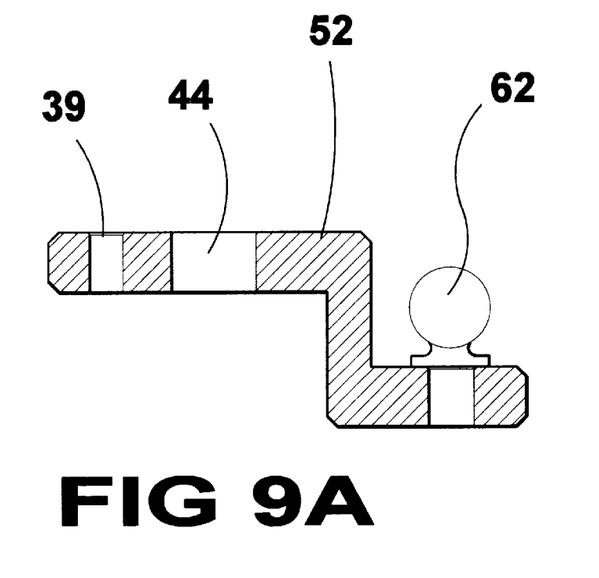
FIG. 9A is a cross sectional view of swivel head, taken from FIG. 9 as indicated. Shown are aperture means for mounting the pivot pin and aperture means for preventing said swivel head from rotating.

Turning to FIG. 9A, shown therein is a cross sectional view of the alternate swivel head 52, taken from FIG. 9 as indicated. Shown are aperture means 44 for mounting the pivot bolt and aperture means 39 for preventing the swivel head 52 from rotating. Trailer hitch ball 62 is also shown.

Figure 10:
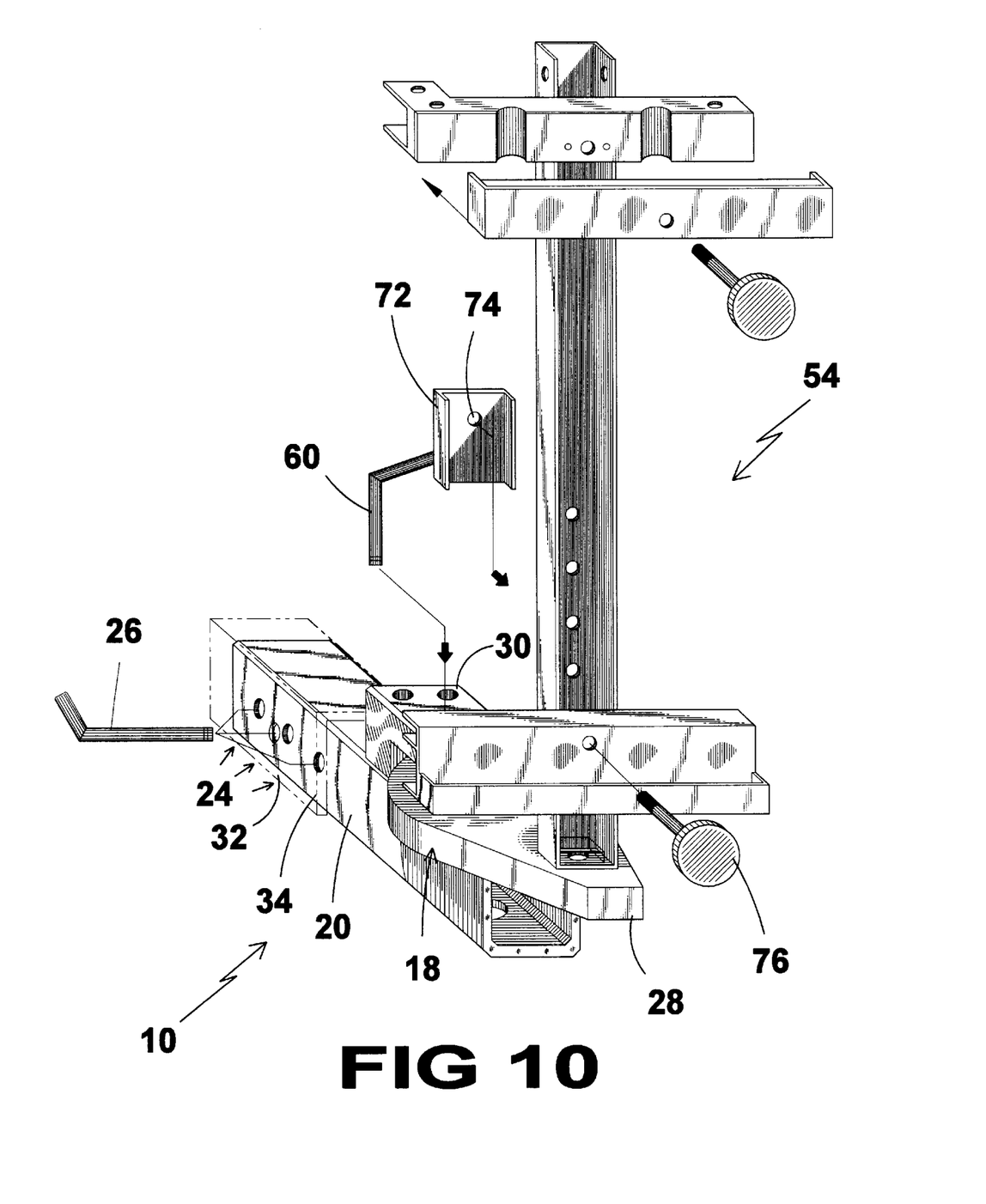
FIG. 10 is a perspective view of the present invention having additional elements providing means for mounting skis thereto. Said rotative element provides for rotating said additional element wherein the vehicles rear access means can be operated without dismantling said additional elements.

Turning to FIG. 10, shown therein is a perspective view of the present invention 10 having additional elements providing means for mounting skis 54 thereto. The rotative element 18 provides for rotating the additional element 54 wherein the vehicles rear access means can be operated without dismantling the additional elements. Certain elements previously described are disclosed.

The present invention 10 is an extendable rotatable hitch/ trailer coupling device which communicates between a conventional vehicle's hitch mounting arm 14 and a trailer's securing means 16. The device extends the means for engaging a trailer to a conventional hitch mounting arm 14 from a fixed point, which usually requires an additional person giving directions as the vehicle approaches the trailer, to an elliptical connection zone whereby the hitch extension member 20 and swivel head member 18 can be selectively engaged either individually or in concert to extend to the trailer hitch component 16.

The hitch assembly is mounted to the existing main hitch mounting arm 32 by inserting the hitch extension member 20 into the aperture 34 of the main hitch mounting arm and fixedly being attached thereto by means of the hitch pin 26.

The hitch extension member 20 has a plurality of spaced apart oppositely opposed transverse holes 24 providing means for selectively choosing, aligning and fixedly positioning the chosen hole with the main hitch mounting arm 14 hole using the hitch attachment pin 26 thereby longitudinally extending the hitch coupling mechanism. In addition the hitch extension member 20 has a rotative coupling sub-assembly 18 positioned on the other end of the hitch extension member 20. Pin 60 has a connecting member 72 with aperture 74 which is fastened by means 76 to the means 54 for mounting skis. Means 54 is of a conventional design.

Figure 11:
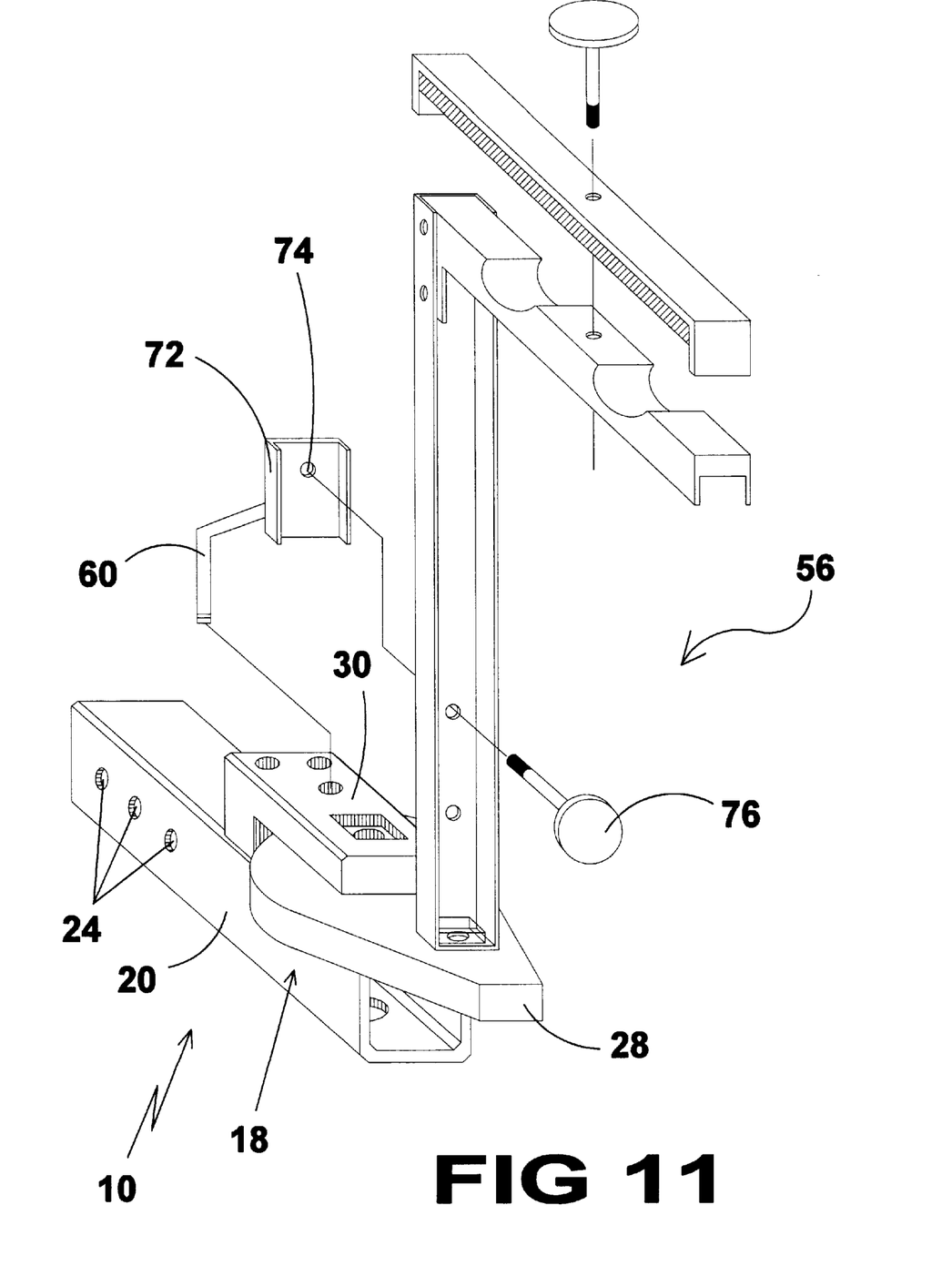
FIG. 11 is a perspective view of the present invention having additional elements providing means for mounting bikes thereto. Said rotative element provides for rotating said additional element wherein the vehicles rear access means can be operated without dismantling said additional elements.

Turning to FIG. 11, shown therein is a perspective view of the present invention 10 having additional elements providing means for mounting bikes 56 thereto. The rotative element 18 provides for rotating the additional element 56 wherein the vehicles rear access means can be operated without dismantling the additional elements 56. Certain elements previously described are disclosed.

The hitch extension member 20 has a plurality of spaced apart oppositely opposed transverse holes 24 providing means for selectively choosing, aligning and fixedly positioning the chosen hole with the main hitch mounting arm hole using the hitch attachment pin thereby longitudinally extending the hitch coupling mechanism. In addition the hitch extension member 20 has a rotative coupling sub-assembly 18 positioned on the other end of the hitch extension member 20. Pin 60 has a connecting member 72 with aperture 74 which is fastened by means 76 to the means 56 for mounting bikes. Means 56 is of a conventional design.

What is claimed to be new and desired to be protected by Letters Patent is set forth in the appended claims:

1. An apparatus for a trailer hitch for connection to a box end trailer hitch receiver, comprising:

a) an extension member, said extension member being box shaped, said extension member having a top surface, said extension member having a shape compatible with the box end trailer hitch receiver;

b) said extension member having a first end for being received internally by the box end trailer hitch;

c) a rotatable member attached to a second end of said extension member, said rotatable member comprising a flat circular body with a converging section, said flat circular body having a locking aperture to receive a pin for locking said rotatable member while a trailer is being towed;

d) means comprising an L-shaped member for attaching said rotatable member to said second end of said extension member, said rotatable member disposed generally horizontally;

e) a means for attaching a trailer hitch ball to said rotatable member comprising an aperture through said converging section, whereby said trailer hitch ball is rotatable;

f) said L-shaped member having a flat portion extending parallel to and spaced from the top surface of said extension member with a free end of said flat portion adjacent the second end of said extension member and a leg portion perpendicular to said flat portion extending down toward the top surface of said extension member;

g) means comprising bolts to attach said leg portion to the top surface of said extension member;

h) said means for attaching said rotatable member to said second end of said extension member comprising a main pivot bolt passing through said flat portion of said L-shaped member, said rotatable member, and said extension member;

i) swivel head spacer washers between the top surface of said rotatable member and the bottom surface of said flat portion, and between the bottom surface of said rotatable member and the top surface of said extension member; and j) a swivel head spacer surrounding said main pivot bolt extending between the top surface of said extension member and the bottom surface of said flat portion.

2. The apparatus of claim 1, said extension member being slidably mountable in the box end trailer hitch receiver.

3. The apparatus of claim 2, wherein the extension member has a generally horizontally placed aperture therein said aperture for receiving a trailer hitch pin.

4. The apparatus of claim 3, said horizontally placed aperture being a plurality of apertures said apertures providing alternative positions for receiving said trailer hitch pin.

5. The apparatus of claim 4, said plurality of apertures disposed in generally the horizontal plane.

6. The apparatus of claim 5, wherein there are three apertures in number.

7. The apparatus of claim 1, said rotatable member being rotatable through an angle of at least 180 degrees whereby said trailer hitch ball is rotatable through an angle of at least 180 degrees.

8. The apparatus of claim 1, further comprising means for mounting skis thereon comprising a vertically extending member mounted at a bottom end over the aperture in the converging section of said rotatable member, a pin connecting member attached to said vertically extending member above said bottom end, and a pin extending from said pin connecting member to and into said locking aperture, and means adjacent an upper end of said vertically extending member for attaching to said skis.

9. The apparatus of claim 1, further comprising means for mounting bikes thereon comprising a vertically extending member mounted at a bottom end over the aperture in said converging section of the rotatable member, a pin connecting member attached to said vertically extending member above said bottom end, and a pin extending from said pin connecting member to and into said locking aperture, and means adjacent an upper end of said vertically extending member for attaching to said bikes.

* * * * *